United States Patent [19]
Barker

[11] 3,859,233
[45] Jan. 7, 1975

[54] GROUT COMPOSITION
[75] Inventor: John P. Barker, Souderton, Pa.
[73] Assignee: American Olean Tile Company, Lansdale, Pa.
[22] Filed: Aug. 17, 1972
[21] Appl. No.: 281,312

Related U.S. Application Data
[62] Division of Ser. No. 49,581, June 24, 1970, abandoned.

[52] U.S. Cl......... 260/17 R, 260/42.13, 260/42.43, 260/29.6 T
[51] Int. Cl. ............................................. C08f 45/08
[58] Field of Search............ 260/17 R, 42.13, 42.43

[56] References Cited
UNITED STATES PATENTS

| | | | |
|---|---|---|---|
| 3,030,258 | 4/1962 | Wagner | 260/17 RX |
| 3,243,307 | 3/1966 | Selden | 260/17 R UX |
| 3,374,192 | 3/1968 | Slysh et al. | 260/17 R |
| 3,386,223 | 6/1968 | Wegwerth | 260/17 R X |
| 3,421,277 | 1/1969 | Frischmuth | 260/17 R UX |
| 3,538,036 | 11/1970 | Peters et al. | 260/17 R UX |
| 3,655,594 | 4/1972 | Medica et al. | 260/17 R |

Primary Examiner—Lucille M. Phynes
Attorney, Agent, or Firm—Paul & Paul

[57] ABSTRACT

Novel compositions are provided which are useful as grout for ceramic tile. The compositions of this invention contain a thermoplastic resin, a white inorganic filler and a finely divided clay and may also contain sand, colorants, agents to control the rate of drying, fungicides, antifoaming agents, wetting agents and thickeners.

6 Claims, No Drawings

GROUT COMPOSITION

This is a division of application Ser. No. 49,581 filed June 24, 1970, now abandoned.

BACKGROUND OF THE INVENTION

1. Field of the Invention

This invention is concerned with grout compositions for ceramic tile.

2. Description of the Prior Art

Ceramic tile is generally employed as a protective and decorative covering for walls and floors in areas which are subject to heavy soiling. It is common, for example, to employ ceramic tile in kitchens and bathrooms in the home and in public and commercial buildings. The primary advantage of employing ceramic tile in these areas is the relative ease of maintaining and cleaning the tiled surface.

Ceramic tile is installed by adhering a plurality of individual ceramic tiles to the area to be covered and then filling the spaces between the individual tiles with grout. The conventional grout for ceramic tile is white portland cement. Since the ceramic tiles that are employed are glazed on their exposed surface, such surface is sealed and limits penetration. Therefore these tiles do not readily soil and if they become soiled they are easily cleaned. However, the white cement grouts heretofore employed were to some extent porous and readily became soiled. The soiled grouts clearly detracted from the overall appearance of the tiled surfaces. Various suggestions were made in the prior art to include additives in the cement based grouts to improve their properties but without notable success. A further problem of the cement based grouts was that the grouts could not be premixed and packaged for future use since the cements would crystallize and harden on standing. In addition, any excess cement based grout could not be salvaged for future use.

In an attempt to overcome the problems of cleanability of the conventional white cement grouts, it was suggested to use grout compositions having an epoxy resin base. The epoxy grouts were cleanable, but were both expensive and difficult to employ. The catalyst for the epoxy resin had to be mixed with the epoxy grout immediately before being applied. Some difficulty was encountered in obtaining a satisfactory distribution of the catalyst through the epoxy grout compositions and the necessity of premixing on-the-job was inefficient and consumed valuable on-the-job time. A further problem encountered with the epoxy grouts was that once the catalyst was added any excess mixed material had to be discarded. This waste of material added considerably to the already high cost of employing the epoxy grouts.

In addition to having resistance to soiling and ease of cleanability, the grout composition should also be relatively simple to apply. In this regard, it would be highly advantageous to have a premixed grout composition which could be applied directly from the container in which it is supplied. It would also be quite valuable if any excess grout could be recovered for use at a later time. The grout composition should also be plastic enough to be readily worked into the spaces between the individual tiles. In addition, the excess grout which is applied should be easily removed from the tile surfaces. The grout should also dry in a relatively short time to a hard finish and with little or no shrinkage.

It is accordingly, an object of this invention to provide a grout which is resistant to soiling and which can readily be cleaned.

It is an additional object of this invention to provide a grout which has workability, is easy to clean up during application and is fast drying and noncracking.

It is a further object of this invention to provide a cleanable premixed grout composition.

Other objects and advantages of this invention will become apparent hereinafter from a reading of the specification and subjoined claims.

SUMMARY OF THE INVENTION

The grout compositions of this invention are comprised of a thermoplastic film forming resin latex, preferably an acrylic latex, a white inorganic filler, for example, whiting and a finely divided clay. The compositions, in addition to containing the above noted components, may also contain additional additives such as thickening agents, silica sand and colorants. The grout composition may also advantageously contain agents to control the rate of drying, fungicides, antifoaming agents and wetting agents.

DESCRIPTION OF THE PREFERRED EMBODIMENT

The grout composition of this invention contains about 4–20, preferably about 7–14 parts by weight (based on solids contents) of a thermoplastic film forming resin latex, preferably a cement grade acrylic resin latex. The thermoplastic resins which are suitable for employment in this invention must be capable of binding together several times their weight of inorganic fillers. In addition, the thermoplastic resins must be air dryable at room temperature to provide a stain resistant, cleanable grout. The thermoplastic resins are preferably of the water dispersible type in order to facilitate clean-up of the tile surfaces after application. The thermoplastic resins are added to the grout composition in the form of a latex containing about 40–60 percent and preferably about 50 percent by weight of the thermoplastic resin.

The acrylic latices which are employed in the compositions of this invention are generally referred to as cement additive grade acrylic latices. In general, acrylic latices of types that may be used to advantage in the practice of the present invention are water-based latices containing polymers of one or more monomers, each of which has the structural formula

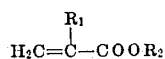

wherein $R_1$ is selected from a group consisting of hydrogen the alkyl radicals of the series $-C_nH_{2n}+1$, $R_2$ is selected from the same group, not including hydrogen and $n$ is a whole number from 1-18.

Examples of polyacrylic latices of this type are latices of 40 to 60% solids content with a particle size of from 0.1 to 1.0 micron that have been compounded from polymers of methyl acrylate, ethyl acrylate, propyl acrylate, butyl acrylate and other alkyl or paraffin esters of acrylic acid having up to 18 or more carbon atoms in the paraffin radical. It is not necessary to the practice of the invention that all of the esters used in forming the polymer be derived from acrylic acid as such; instead, a large part of the polymer may be and often is, derived from alpha methyl acrylic acid, alpha ethyl acrylic acid, and other acids of the same homologous series having up to eighteen carbon atoms in the substituent. In general, those latices considered to be of maximum value are ones containing homopolymers and copolymers of the esters of acrylic and alpha-methyl acrylic acid, particularly well known commercial acrylic acid esters. Preferred for purposes of the invention are commerically prepared polyacrylic latices having polymers with low glass transition temperatures.

When a homopolymeric acrylic resin latex is employed in the compositions of this invention, it is preferable to use homopolymers of lower alkyl (1-4 carbon atoms) acrylates or lower alkyl (1-4 carbon atoms) methacrylates.

It has been found that it is especially advantageous to use polyacrylic latices which are obtained by the copolymerization of a plurality of acrylic ester monomers. For example, copolymers can be obtained having especially good properties for employment in the grout compositions of this invention by copolymerizing a mixture comprised of a major part of ethyl acrylate and a minor part of methyl acrylate.

A class of polymeric acrylic latices which have proven to be especially useful are those disclosed by Conn et al. U.S. Pat. No. 2,795,564. These copolymer latices are obtained by the copolymerization of at least three different types of alpha, beta-unsaturated monomers. The class of polymeric acrylic latices disclosed by Conn et al. are indicated to be aqueous dispersions of certain water insoluble acrylic interpolymers. The interpolymers are obtained by emulsifying in balanced proportions a polymerizable alpha, beta-unsaturated monovinylidene carboxylic acid or a water-soluble salt thereof, at least one neutral monomeric monovinylidene ester which is polymerizable with free radical catalysts and which by itself forms a soft polymer, and at least one neutral monovinylidene monomer which is polymerizable with free radical catalysts and which by itself forms a hard polymer, emulsification being accomplished with a surface-active agent, such as water-soluble nonionic alkylphenoxypolyethoxyethanols in an aqueous medium; supplying thereto a free radical polymerizing catalyst in a redox system; then polymerizing together said acid or salt, said ester, and said monomer at a temperature below that at which coagulation would occur in the dispersion, whereby a dispersion of a water-insoluble interpolymer is formed in the aqueous medium; and bringing the pH of the dispersion to a value between 8 and 10.

As polymerizable alpha, beta-unsaturated monovinylidene carboxylic acids, there are used acrylic acid, methacrylic acid, or other alpha-substituted polymerizable acrylic acid, or itaconic acid. The preferred acids are methacrylic and then acrylic. In place of the free acids there may be used water-soluble salts thereof, including the ammonium salts and the alkali metal salts such as lithium or potassium carboxylates.

As polymerizable, neutral, monomeric monovinylidene esters which form soft, solid polymers in the presence of peroxide catalysts, there may be used any primary and secondary alkyl acrylate, even with alkyl substitutents up to eighteen or more carbon atoms, primary or secondary alkyl methacrylates with alkyl substituents of five to eighteen. The preferred monovinylidene compounds are the acrylates and methacrylates and of these the most practical esters are those with alkyl groups or not over 12 carbon atoms.

The preferred monomers which by themselves yield soft polymers may be summarized by the formula

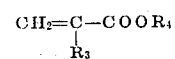

wherein $R_3$ is hydrogen or the methyl group and $R_4$ represents, when $R_3$ is methyl, a primary or secondary alkyl group of 5 to 18 carbon atoms, or, when $R_3$ is hydrogen, an alkyl group of not over 18 carbon atoms, or better, or 2 to 12 carbon atoms.

As polymerizable monovinylidene monomers which by themselves from hard polymers, there may be used alkyl methacrylates having alkyl groups of not over four carbon atoms, also tert.-amyl methacrylate, tert.-butyl or tert.-amyl acrylate, cyclohexyl acrylate or methacrylate, acrylonitrile, or methacrylonitrile.

Preferred monomers which by themselves form hard polymers may be summarized by the formula

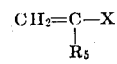

wherein $R_5$ is a hydrogen or the methyl group and wherein X represents one of the groups —CN, and ester-forming groups —COOR$_6$, wherein $R_6$ is cyclohexyl or, when $R_5$ is hydrogen, a tert.-alkyl group of 4 to 5 carbon atoms, or, when $R_5$ is methyl, an alkyl group of 1 to 4 carbon atoms. Specific compounds are methyl methacrylate, ethyl methacrylate, propyl methacrylate, isopropyl methacrylate, butyl methacrylate, sec.-butyl methacrylate, and tert.-butyl methacrylate.

At least one of each of the above three classes of polymerizable materials must be used. The unsaturated carboxylic acid or salt is interpolymerized in a proportion usually between about 0.5% and 2.5% by weight, preferably between 0.8% and 2%, of the interpolymer. The interpolymers which are useful in the grouts of this invention have proportions of monomers forming soft polymers to proportions of monomers forming hard polymers in the range of from about 9:1 to 1:20 with, as noted above, 0.5-2.5 % by weight of the interpolymer being comprised of the unsaturated carboxylic acid.

The proportions of the monomers are selected so as to obtain a final interpolymer having a balance of properties.

The acrylic latices employed in this invention, whether it be a homopolymeric or copolymeric material, are polymerized to relatively high molecular weights. The molecular weights can be from, for example, 100,000 up into the millions. The acrylic latices utilized in this invention bind the remaining components of the grout together into a unitary mass as a result of drying rather than polymerization. Accordingly, it is not necessary to add catalysts or the like to the compositions of this invention immediately before use and any excess material can be saved for future use by simply preventing the grout from drying out.

While the acrylic resins are the preferred class of thermoplastic resins for employment in this invention, other types of thermoplastic resins may also be used in place of the acrylic resin or in combination with the acrylic resins. The polyvinyl acetate polymers are particularly useful. Copolymers of vinyl acetate with dibutyl fumarate, vinyl chloride, vinyl alkyl ethers, vinylidene chloride, ethylene and other similar thermoplastic resins may be used to some advantage in the present compositions. The exact amount of thermoplastic resin latices that must be used in order to obtain a grout composition having the optimum properties will vary depending upon the particular thermoplastic resin employed and the other components of the composition. The amount of thermoplastic resin which is added should be an amount at least sufficient to bond the composition together and impart stain resistance and cleanability to the composition and should not exceed 20% by weight of the total grout composition.

The grout composition of this invention further contains various mineral fillers. The particle size ranges of these mineral fillers are important as they establish optimum packing which contributes strongly to the stain resistance characteristics and the surface smoothness of the dried grout. There are also, however, lower limits in respect to the particle size, which if uncontrolled, can be detrimental to the structural strength of the dried grout. The minimum average particle size should be above 20 microns.

One of the principal components of this invention is 20-60 parts by weight and preferably 35-45 parts by weight of a white inorganic filler. Various well known types of white inorganic fillers can be employed. The preferred white inorganic filler for use in this invention is whiting. The grades of whiting (calcium carbonate) that are most suitable for employment in the grout cmpositions of this invention have a particle size through 325 mesh. The grout compositions should contain about 20-60 parts by weight, preferably about 35-45 parts by weight of whiting.

The use of whiting in this invention is quite surprizing because of its inherent lack of acid resistance, especially to those acidic agents in certain foods and in cleaning compounds. However, in the compositions of this invention after these compositions have been applied and allowed to dry at room temperatures, the whiting is not noticeably affected by these acids.

Other white inorganic fillers which may be used are for example, calcium mono-silicate, flint, alumina, talc pyrophyllite and other alumino-silicate materials.

The grout composition further contains up to about 25 parts preferably, 8-15 parts by weight of a finely divided 2-20 micron clay. The clay is believed to further fill in the space between the particles of the white inorganic filler and has a definite beneficial effect on the stain resistance of the grout. Various types of finely divided clays can be used such as kaolin, china clay, bentonite or ball clay. The processed kaolins such as Avery clay sold by Harris Mining Company have proven to be most useful.

In addition to the above noted components, it is of considerable advantage to add certain other materials to the grout composition. Thickening agents can be added to increase the viscosity of the grout composition. Various types of well known thickeners can be employed. Particular attention is directed to the cellulose derivatives such as methyl cellulose and hydroxyethyl cellulose. The amount of the thickener that is employed is dependent on the particular thickeners employed, the other components of the composition and the desired viscosity of the final product. However, using the above noted cellulose derivatives, relatively low amounts are required. For example, using colloidal hydroxyethyl cellulose, only 0.02 to 0.5% by weight is required. The above noted cellulose derivatives have the added advantage of increasing the open time, that is the time in which the grout compositions can be worked after being applied to the tiled surfaces. An additional thickener which can be used in mica. When up to 15 parts by weight, preferably about 5 parts by weight of a finely divided (325 mesh) wet ground mica is added to the composition, it absorbs any excess liquid and substantially increases the viscosity. In addition, the presence of the mica in the composition imparts platy characteristics to the composition.

Up to 50 parts by weight, preferably about 10-20 parts by weight of silica sand (through 70-100 mesh) when added to the grout composition, assists the cleaning of the excess grout from the surfaces of the tile during application, by acting as a mild abrasive. For this purpose, sands with sharp edged grains are preferred to those with rounded grains.

When it is desired to have colored grouting, a tinctorially effective amount of a colorant is added to the grout composition. The type and amount of colorant that is employed is dependent on the desired color and depth of shade desired. When a white grout is desired titanium dioxide is advantageously added to the composition.

Other additives which can be incorporated to some advantage are for example, agents to control the rate of drying fungicides, wetting agents and antifoaming agents. The agents to control the rate of drying which have proven to be most useful are the polyhydric alcohols having 2 to 6 carbon atoms, in particular ethylene glycol. When ethylene glycol is employed, up to about 20 parts by weight is added to the composition.

The fungicides that can be employed in the composition are well known in themselves for example, phenyl mercuric salts, trialkyl tin oxide and commercial products such as Advacide TJP-Special manufactured by Advance Division, Carlisle Chemical Works. The amount of fungicide that must be added to the composition to be effective is dependent on the particular fungicide employed.

A wetting agent can be added to the composition of this invention. The addition of a wetting agent assists considerably in the preparation of the composition, and the wetting agents are useful in preventing caking of the composition on extended storage in containers. The selection of the wetting agent that is employed is to a large extent a matter of personal preference. The requirements for the wetting agent are that it effectively wet out the composition and not adversely affect the other components of the composition especially the thermoplastic resin. A commercially available wetting agent that has proven to be particularly useful is Tamol 731 manufactured by The Rohm and Haas Company.

The addition of antifoaming agents facilitates both the initial preparation of the composition and the application of the grouting composition to the tile. An example of a suitable antifoaming agent is Antifoam 60 manufactured by the General Electric Company.

The compositions of this invention are prepared by simply blending together the required amount of each of the above noted components. It should be noted that the compositions of the present invention can contain from 65% to 85%, by weight of fillers and still be quite workable. The blended compositions are kept covered to prevent drying until ready for use.

The grout compositions of this invention are applied in the conventional manner by forcing the composition into the spaces between the tiles and then wiping the excess grout composition from the tile. The grout compositions of this invention, when allowed to dry at room temperature, have an initial set in approximately one hour and should be fully dried in about three to seven days.

Once the grouting is dry, it is highly resistant to both staining and soiling and can readily be cleaned if it does become soiled.

The following examples are given by way of illustration and are not intended to limit the scope of the subjoined claims. The parts given are to be understood to be parts by weight, not parts by volume unless otherwise indicated.

EXAMPLE 1

A grout composition was prepared by blending together the following components:
a. 19 grams of an aqueous (46% solids) cement additive grade acrylic latex of a copolymer comprised of approximately equal parts of butyl acrylate and methyl methacrylate plus 1½% by weight of methacrylic acid.
b. 6 grams ethylene glycol
c. 43 grams whiting through 325 mesh
d. 12.5 grams kaolin (15 microns)
e. 0.030 grams hydroxyethyl cellulose (commercially known as Cellulosize QP-300)
f. 16 grams silica sand (through 100 mesh)
g. 3 grams titanium dioxide (stir-in grade) (TiPure R-900 DuPont)
h. 0.50 grams tributyl tin oxide and phenyl mercuric salts (Advacide TJP-Special, Advance Division, Carlisle Chemical Works)
i. 0.03 grams silicone type antifoaming agent (Antifoam 60 — General Electric Company)
j. 0.025 grams wetting agent (Tamol 731 — Rohm and Haas Company)

The grout composition above was formulated and applied to a test panel prepared by adhering nine 4¼ × 4¼ inch glazed cushion-edged tiles to a gypsum backerboard. The grout composition was worked into the spaces between the individual tiles and the excess grout was removed from the glazed surfaces. The test panel was allowed to air dry for 7 days at room temperature prior to being subjected to the various testing procedures.

EXAMPLE 2

A grout composition was prepared which was comprised of:
a. 28 grams cement additive grade acrylic latex (46%) described in Example 1
b. 12 grams kaolin (15 microns)
c. 60 grams whiting (through 325 mesh)

A test panel similar to that described in Example 1 was treated with the grout compositions prepared above and subjected to the testing procedures as described below.

The workability of this composition was satisfactory, but not as good as that of the composition of Example 1 and the excess grout was more difficult to remove from the glazed tile surface.

EXAMPLE 3

Example 2 was repeated with the exception that 12 grams of whiting was replaced with 12 grams of silica sand.

The workability of this composition was similar to that of the composition of Example 2, but it was considerably easier to clean the excess grout from the glazed tile surface of the test panel.

EXAMPLE 4

Example 2 was repeated with the exception that 3 grams of (through 325 mesh) wet ground mica was included in the composition. The viscosity of the composition was considerably higher than the viscosity of the composition in Example 2, but the composition was still workable.

EXAMPLE 5

Example 2 was repeated with the exception that 7 grams of the acrylic latex was replaced with 7 grams of ethylene glycol. The properties of this composition were similar to the properties of the composition of Example 2 with the exception that fludity was somewhat higher and the composition was workable for a longer period of time.

EXAMPLE 6

Example 1 was repeated except that the acrylic copolymer latex of Example 1 was replaced with a 46% solids copolymer latex consisting of about 75% by weight of ethyl acrylate and 25% by weight methyl methacrylate. The workability was about equivalent as the composition of Example 1.

EXAMPLE 7

Example 1 was repeated with the exception that the terpolymer of Example 1 was replaced with an equivalent amount on a solid basis of a copolymer consisting primarily of ethylacrylate and a minor amount of acrylonitrile such that the resulting polymer had a glass transition temperature of about −5°C. The workability of this composition was similar to that of Example 1.

EXAMPLE 8

Example 1 was repeated with the exception that a terpolymer was used comprised of 73% ethyl acrylate, 25% methyl methacrylate and 2% methacrylic acid. The workability again was similar to that of the composition of Example 1.

EXAMPLE 9

Example 1 was repeated with the exception that acrylic terpolymer was replaced with an equivalent amount based on solids content of methyl acrylate latex having a molecular weight at about 1,500,000. The composition was similar in properties to the composition produced in Example 1.

EXAMPLE 10

Example 1 was repeated with the exception that an equivalent amount based upon solids content, of methyl acrylate was employed to replace the methyl methacrylate in Example 1. The composition was similar in properties to the composition produced in Example 1.

EXAMPLE 11

In order to evaluate the soil resistance and cleanability of the grout compositions of this invention, the test panels prepared in Examples 1 to 10 were evaluated against a similar panel having white cement grouting. The test was conducted by contacting the test panels in selected areas with common household soiling material. These included washable blue-black ink, hamburger fat, coffee, tea, mustard, ketchup, grape jelly and chocolate syrup.

A portion of the test panels were treated with the test soils and then almost immediately the test soils were removed. A second portion of the test panels were allowed to remain in contact with the test soils until they had dried on the surface.

The cleanability was evaluated by attempting to remove the test soils from the grout by scrubbing the grout with a stiff bristled toothbrush and a household type abrasive cleaner.

The test panel grouted with white cement had fair to poor resistance to stains depending primarily on the fluidity of the test soil when the soils were almost immediately removed. However, when the soil was allowed to set for twenty-four hours, all of the test soils noted above to some extent permanently stained the white cement grout. All of the test panels prepared in Examples 1 to 8 showed excellent resistance to staining when the test soil was promptly removed and good to excellent resistance to stains when the soil was allowed to set twenty-four hours before being removed.

What is claimed is:

1. The grout composition consisting essentially of: 4–20 parts by weight of an aqueous thermoplastic resin latex containing a polymer selected from the class consisting of (1) polymers of one or more monomers, each of which has the structural formula

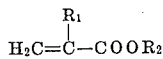

wherein $R_1$ is selected from a group consisting of hydrogen and the alkyl radicals of the series — $C_nH_{2n}1$, $R_2$ is selected from the same group, not including hydrogen and $n$ is a whole number from 1–18, (2) polyvinyl acetate polymers, (3) copolymers of vinyl acetate with dibutyl fumarate, (4) vinyl chloride polymers, (5) vinyl alkyl ether polymers, (6) vinylidene chloride polymers and (7) ethylene polymers, said parts by weight being based on the resin content of said latex; 20–60 parts by weight of a white inorganic filler selected from the class consisting of whiting, calcium mono-silicate, flint, alumina, talc, pyrophylite and aluminum silicate; up to 25 parts by weight of a finely divided clay having a particle size from about 2–20 microns; and a viscosity increasing effective amount of a thickener selected from the class consisting of methyl cellulose and hydroxyethyl cellulose, said thermoplastic resin comprising at most 20 percent by weight of said composition with said white inorganic filler being the principal component of said composition.

2. The composition according to claim 1 which contains 0.02 to 0.5 parts by weight of hydroxyethyl cellulose.

3. The composition according to claim 1 which contains 0.02 to 0.5 parts by weight of methyl cellulose.

4. The composition according to claim 1 which contains up to 15 parts by weight of mica having a particle size through 325 mesh.

5. The composition of matter according to claim 1 consisting essentially of about 7 to 14 parts by weight based on solid content of said acrylic latex, 35–45 parts by weight of whiting having particles of a mesh size through 325, about 8–15 parts by weight of kaolin having a particle size from about 2–20 microns, 0.02–0.5 parts by weight of hydroxyethylcellulose, up to 20 parts by weight of silica sand in that range passing 70 to 100 mesh, and up to 20 parts by weight of ethylene glycol.

6. The composition according to claim 1 wherein said thermoplastic resin latex is a member selected from the group consisting of a homopolymeric acrylic resin latex, a copolymeric acrylic resin latex and a terpolymeric acrylic resin latex.

* * * * *